United States Patent
Kachita et al.

(10) Patent No.: US 9,887,778 B2
(45) Date of Patent: Feb. 6, 2018

(54) OPTICAL AMPLIFIER, OPTICAL TRANSMISSION APPARATUS, AND OPTICAL REPEATING APPARATUS

(71) Applicant: FUJITSU LIMITED, Kawasaki-shi, Kanagawa (JP)

(72) Inventors: Yoshito Kachita, Kawasaki (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 15/134,630

(22) Filed: Apr. 21, 2016

(65) Prior Publication Data

US 2016/0315708 A1    Oct. 27, 2016

(30) Foreign Application Priority Data

Apr. 24, 2015  (JP) ................... 2015-089488

(51) Int. Cl.
*H04B 10/29* (2013.01)
*H04B 10/294* (2013.01)

(52) U.S. Cl.
CPC ................ *H04B 10/2942* (2013.01)

(58) Field of Classification Search
CPC .................. H04B 10/2942; H04B 10/564
See application file for complete search history.

(56) References Cited

U.S. PATENT DOCUMENTS

| 6,069,731 A | 5/2000 | Bayart | |
| 2002/0079435 A1* | 6/2002 | Kuroshima | G01J 1/20 250/227.21 |
| 2002/0171917 A1* | 11/2002 | Lelic | H04B 10/077 359/341.4 |
| 2010/0158532 A1* | 6/2010 | Goto | H04B 10/07955 398/81 |
| 2015/0304050 A1* | 10/2015 | Watanabe | H04B 10/541 398/186 |

FOREIGN PATENT DOCUMENTS

| JP | 5-218974 | 8/1993 |
| JP | 11-509070 | 8/1999 |
| JP | 2000-236298 | 8/2000 |
| JP | 2002-198911 | 7/2002 |

* cited by examiner

*Primary Examiner* — Dzung Tran
(74) *Attorney, Agent, or Firm* — Staas & Halsey LLP

(57) ABSTRACT

An optical amplifier includes: an amplification section includes a plurality of routes; a determination section that selects a passage route, through which the multi-wavelength optical signal passes, among the plurality of routes; an input-side detector that detects input power of the multi-wavelength optical signal input to the amplification section; a variable optical attenuator that attenuates the multi-wavelength optical signal that is amplified through passing through the passage route determined by the determination section; an output-side detector that detects output power of the multi-wavelength optical signal attenuated by the variable optical attenuator; a controller that controls the amplification section based on the input power detected by the input-side detector and the output power detected by the output-side detector such that a gain of the amplification section is steady; and an adjuster that adjusts an attenuation of the variable optical attenuator in accordance with the input power detected by the input-side detector.

15 Claims, 13 Drawing Sheets

OPTICAL AMPLIFIER, OPTICAL TRANSMISSION APPARATUS, AND OPTICAL REPEATING APPARATUS

CROSS-REFERENCE TO RELATED APPLICATION

This application is based upon and claims the benefit of priority of the prior Japanese Patent Application No. 2015-089488, filed on Apr. 24, 2015, the entire contents of which are incorporated herein by reference.

FIELD

The embodiments discussed herein are related to an optical amplifier, an optical transmission apparatus, and an optical repeating apparatus.

BACKGROUND

With an increase in demand for communication, optical networks using wavelength division multiplexing (WDM) have become widely prevalent. Wavelength division multiplexing is a technology for multiplexing a plurality of optical signals with different wavelengths and transmitting a multiplexed signal. Wavelength division multiplexing is capable of, for example, multiplexing optical signals with 40 wavelengths at a transmission rate of 40 Gbps and transmitting the optical signals as a multi-wavelength optical signal (hereinafter referred to as a "multiple optical signal") at 1.6 Tbps.

For example, a reconfigurable optical add-drop multiplexer (ROADM) apparatus is known as an optical transmission apparatus using WDM. A ROADM apparatus is provided with an optical amplifier which amplifies a multiple optical signal input from a transmission path. A gain of the optical amplifier is controlled in order to compensate for a transmission loss in the transmission path and secure predetermined power of a multiple optical signal.

The gain of the optical amplifier is controlled by, for example, adjusting an attenuation of a variable optical attenuator (VOA) which is provided between two erbium-doped fiber amplifiers (EDFAs) which amplify a multiple optical signal. However, to expand a control range for the gain to cope with a wide variety of transmission loss, expansion of a variable range for the attenuation of the VOA is desired. The expansion degrades a noise figure (NF) of the optical amplifier.

For this reason, the optical amplifier is configured to select an appropriate one from among the plurality of EDFAs different in amplifying characteristic with an optical switch or the like. The range of control of the gain is expanded by adjusting the attenuation of the VOA.

The gain of the optical amplifier is desirably flattened to be steady regardless of wavelength so as not to cause a difference in power between light rays of individual wavelengths included in a multiple optical signal. However, if an EDFA to amplify a multiple optical signal is selected from among the plurality of EDFAs, as described above, an amplifying characteristic depends on the selected EDFA. This suffers from the problem of the difficulty in flattening a gain.

The followings are reference documents.
[Document 1] Japanese Laid-open Patent Publication No. 5-218974 and
[Document 2] Japanese National Publication of International Patent Application No. 11-509070.

SUMMARY

According to an aspect of the invention, an optical amplifier includes: an amplification section includes a plurality of routes, each of the plurality of routes has an amplifying characteristic for amplifying a multi-wavelength optical signal to pass through the routes, the amplifying characteristic of one of the plurality of routes is different from the amplifying characteristic of other of the plurality of routes; a determination section that selects a passage route, through which the multi-wavelength optical signal passes, among the plurality of routes; an input-side detector that detects input power of the multi-wavelength optical signal input to the amplification section; a variable optical attenuator that attenuates the multi-wavelength optical signal that is amplified through passing through the passage route determined by the determination section; an output-side detector that detects output power of the multi-wavelength optical signal attenuated by the variable optical attenuator; a controller that controls the amplification section based on the input power detected by the input-side detector and the output power detected by the output-side detector such that a gain of the amplification section is steady; and an adjuster that adjusts an attenuation of the variable optical attenuator in accordance with the input power detected by the input-side detector, wherein the adjuster switches a relationship of the attenuation with the input power in accordance with the passage route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Comparative Examples

Figure 1:
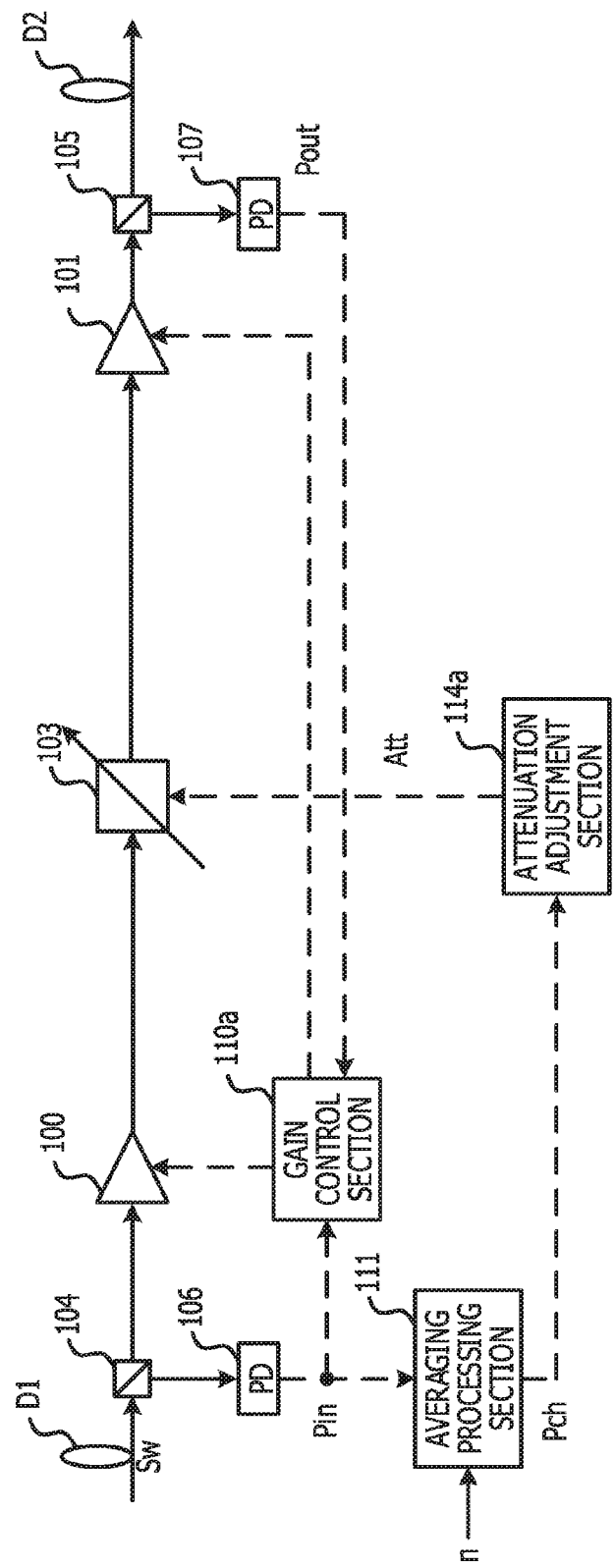
FIG. 1 is a configuration diagram illustrating an optical amplifier according to a first comparative example.

FIG. 1 is a configuration diagram illustrating an optical amplifier according to a first comparative example. The optical amplifier includes optical demultiplexers 104 and 105, photo detectors (PDs) 106 and 107, EDFAs 100 and 101, a variable optical attenuator 103, a gain control section 110a, an averaging processing section 111, and an attenuation adjustment section 114a. The gain control section 110a, the averaging processing section 111, and the attenuation adjustment section 114a are each composed of, for example, a logic circuit. Note that, in FIG. 1, a solid arrow indicates a route for an optical signal while a dotted arrow indicates a route for an electric signal.

The optical amplifier is used in an optical transmission apparatus, an optical repeating apparatus, or the like, as will be described later. The optical amplifier amplifies a multiple optical signal Sw input from a transmission path D1 and outputs the amplified multiple optical signal Sw to a transmission path D2. Note that the transmission paths D1 and D2 are, for example, optical fibers and each connect units in an apparatus or a local apparatus and a remote apparatus.

The optical demultiplexer 104 is, for example, an optical splitter, and demultiplexes the multiple optical signal Sw input from the transmission path D1 into components and outputs the respective components to the PD 106 and the EDFA 100. The EDFA 100 amplifies the multiple optical signal Sw input from the optical demultiplexer 104 and outputs the amplified multiple optical signal Sw to the variable optical attenuator 103.

The variable optical attenuator 103 attenuates the multiple optical signal Sw input from the EDFA 100. Attenuation Att of the variable optical attenuator 103 is adjusted by the attenuation adjustment section 114a.

The EDFA 101 amplifies the multiple optical signal Sw input from the variable optical attenuator 103 and outputs the amplified multiple optical signal Sw to the optical demultiplexer 105. The EDFAs 100 and 101 each include, for example, an erbium-doped fiber (EDF), a multiplexer/demultiplexer, an excitation light source, such as a laser diode (LD), an isolator, and a gain equalizer (GEQ). Note that a device for amplifying the multiple optical signal Sw is not limited to the EDFAs 100 and 101 and that any other amplifying module may be used.

The optical demultiplexer 105 is, for example, an optical splitter, and demultiplexes the multiple optical signal Sw input from the EDFA 101 into components and outputs the respective components to the PD 107 and the transmission path D2.

The PD 106 is one example of an input-side detection section, and detects input power Pin of the multiple optical signal Sw input to the EDFA 100 and notifies the averaging processing section 111 and the gain control section 110a of the input power Pin. The PD 107 is one example of an output-side detection section, and detects output power Pout of the multiple optical signal Sw amplified by the EDFA 101 and notifies the gain control section 110a of the output power Pout.

The gain control section 110a controls the EDFAs 100 and 101 based on the input power Pin detected by the PD 106 and the output power Pout detected by the PD 107 such that a gain of the optical amplifier is steady. The gain increases with a decrease in the attenuation Att of the variable optical attenuator 103 and decreases with an increase in the attenuation Att. The gain control section 110a performs control so as to keep the gain steady, for example, even if the number of wavelengths of the multiple optical signal Sw changes.

The attenuation adjustment section 114a adjusts the attenuation Att of the variable optical attenuator 103 in accordance with the input power Pin of the multiple optical signal Sw detected by the PD 106. More specifically, the attenuation adjustment section 114a adjusts the attenuation Att of the variable optical attenuator 103 in accordance with average input power Pch which is calculated by the averaging processing section 111.

The averaging processing section 111 acquires the number n of wavelengths from a control unit (not illustrated) and calculates the average input power Pch per wavelength (or per channel) (=Pin/n) for the input power Pin detected by the PD 106. Notification of the calculated average input power Pch is given to the attenuation adjustment section 114a. Note that the number n of wavelengths indicates the number of wavelengths included in the multiple optical signal Sw, that is, the number of channels in use.

$$Att=Pch+\alpha \qquad (1)$$

By way of example, the attenuation adjustment section 114a adjusts the attenuation Att of the variable optical attenuator 103 using expression (1) above. In expression (1), α represents a correction value to be determined in accordance with an amplifying characteristic of the EDFA 100. That is, the attenuation Att is calculated as the sum of the average input power Pch and the correction value α.

Figure 2:
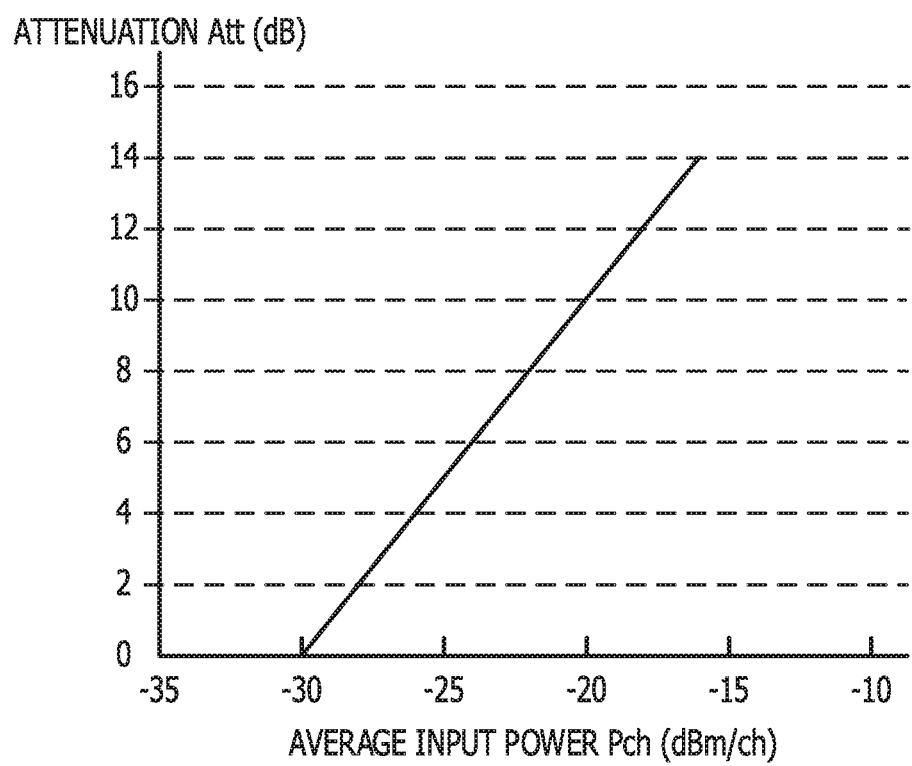
FIG. 2 is a graph illustrating a relationship of attenuation with average input power according to the first comparative example.

FIG. 2 is a graph illustrating a relationship of the attenuation Att with the average input power Pch according to the first comparative example. In the present example, the correction value α is set at, for example, 30 dBm. For this reason, the attenuation Att is 0 dB when the average input power Pch is −30 dBm. The attenuation Att increases with an increase in the average input power Pch in accordance with expression (1). The attenuation adjustment section 114a is capable of keeping the sum of gains of the EDFAs 100 and 101 steady by adjusting the attenuation Att in response to a variation in the average input power Pch. This inhibits a gain deviation from being caused by changes in the gains of the EDFAs.

As described above, the gain of the optical amplifier is controlled by adjusting the attenuation Att of the variable optical attenuator 103. However, to expand a control range for the gain to cope with a wide variety of transmission loss, expansion of a variable range for the attenuation Att of the variable optical attenuator 103 is desired. The expansion degrades a noise figure (NF) of the optical amplifier.

For this reason, an optical amplifier is configured to select an appropriate one from among a plurality of EDFAs different in amplifying characteristic with an optical switch or the like, as will be described below. A control range for a gain is expanded by adjusting the attenuation Att of the variable optical attenuator 103.

Figure 3:
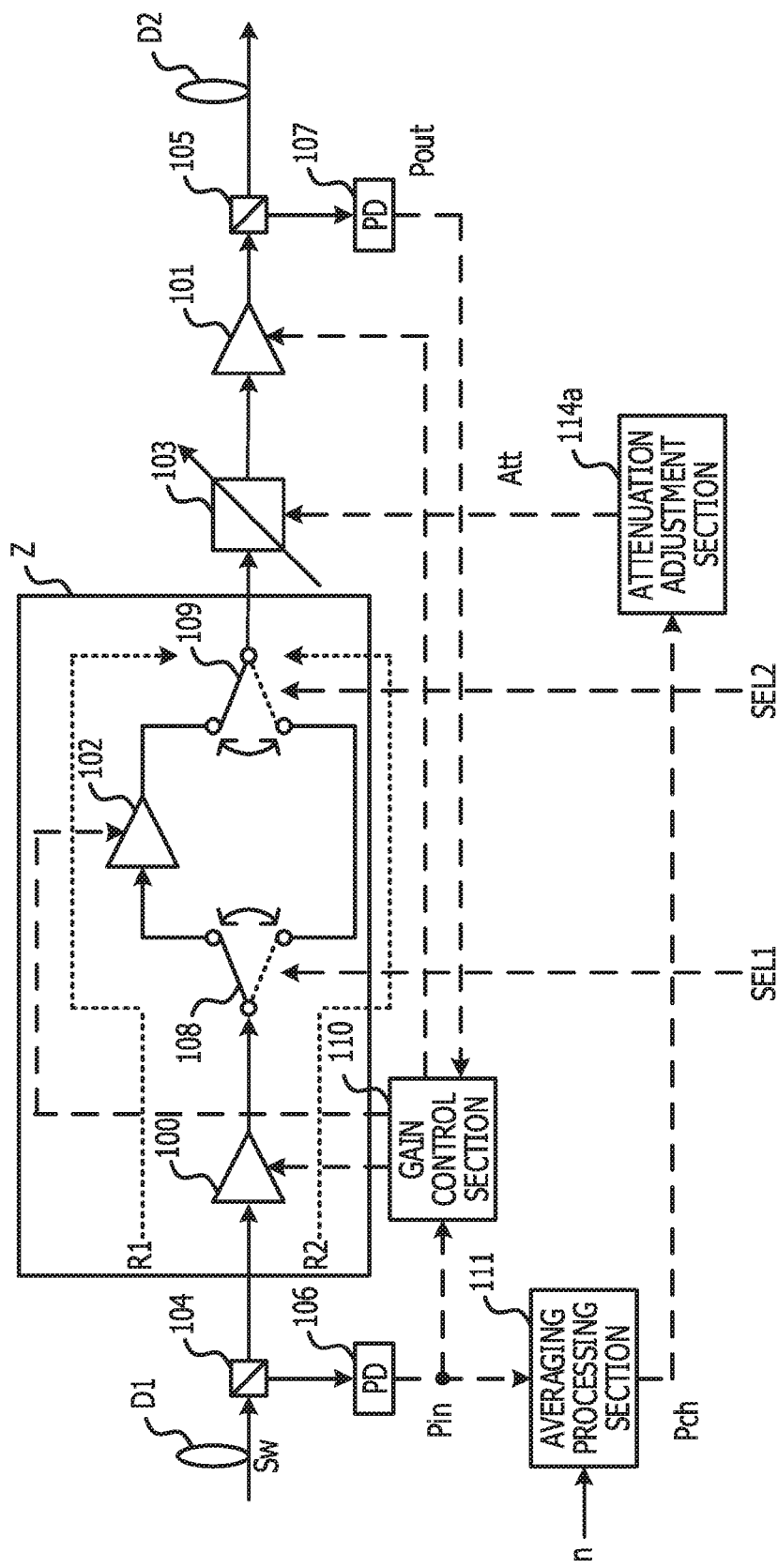
FIG. 3 is a configuration diagram illustrating an optical amplifier according to a second comparative example.

FIG. 3 is a configuration diagram illustrating an optical amplifier according to a second comparative example. In FIG. 3, the same components as those in FIG. 1 are denoted by the same reference characters, and a description thereof will be omitted.

The optical amplifier includes optical demultiplexers 104 and 105, PDs 106 and 107, EDFAs 100 to 102, a variable optical attenuator 103, optical switches 108 and 109, a gain control section 110, an averaging processing section 111, and an attenuation adjustment section 114a. The gain control section 110, the averaging processing section 111, and the attenuation adjustment section 114a are each composed of, for example, a logic circuit.

The EDFAs 100 to 102 amplify a multiple optical signal Sw. The multiple optical signal Sw output from the EDFA 100 passes through a route R1 or R2 in accordance with switching statuses of the optical switches 108 and 109 and is input to the variable optical attenuator 103. The route R1 runs through the EDFAs 100 and 102, and the route R2 runs through the EDFA 100 alone. For this reason, the routes R1 and R2 are different in amplifying characteristic for amplifying the multiple optical signal Sw. Note that the EDFAs 100 and 102 and the optical switches 108 and 109 are included in an amplification section Z.

The switching statuses of the optical switches 108 and 109 are controlled in accordance with switching signals SEL1 and SEL2, respectively. That is, the optical switches 108 and 109 switch a passage route, through which the multiple optical signal Sw passes, from the route R1 or R2 in accordance with the switching signals SEL1 and SEL2. Note that although the two routes R1 and R2 are provided as candidates for the passage route for the optical attenuator in the present example, there is no limit to the number of routes as candidates for a passage route.

As described above, selection of the passage route for the multiple optical signal Sw from among the plurality of routes R1 and R2 allows expansion of an effective range of the average input power Pch of the multiple optical signal Sw. Note that although the EDFA 100 alone is provided on the route R2 in the present example, a different EDFA may be provided between the optical switches 108 and 109 in parallel with the EDFA 102.

The gain control section 110 is one example of a control section, and controls the EDFAs 100 to 102 based on input power Pin which is detected by the PD 106 and output power Pout which is detected by the PD 107 such that gains of the EDFAs 100 to 102 are steady, like the gain control section 110a according to the first comparative example. A gain of the optical amplifier is desirably flattened to be steady regardless of wavelength so as not to cause a difference in power between light rays of individual wavelengths included in the multiple optical signal Sw.

However, if the passage route for the multiple optical signal Sw is determined from among the plurality of routes R1 and R2 (that is, if an amplifying module to amplify the multiple optical signal Sw is selected), as in the present example, an amplifying characteristic depends on the determined passage route. This suffers from the problem of the difficulty in flattening a gain.

For this reason, in the embodiments below, a gain deviation for each wavelength is reduced by switching a relationship of attenuation Att with the input power Pin of the multiple optical signal Sw in accordance with a determined passage route for the multiple optical signal Sw.

First Embodiment

Figure 4:
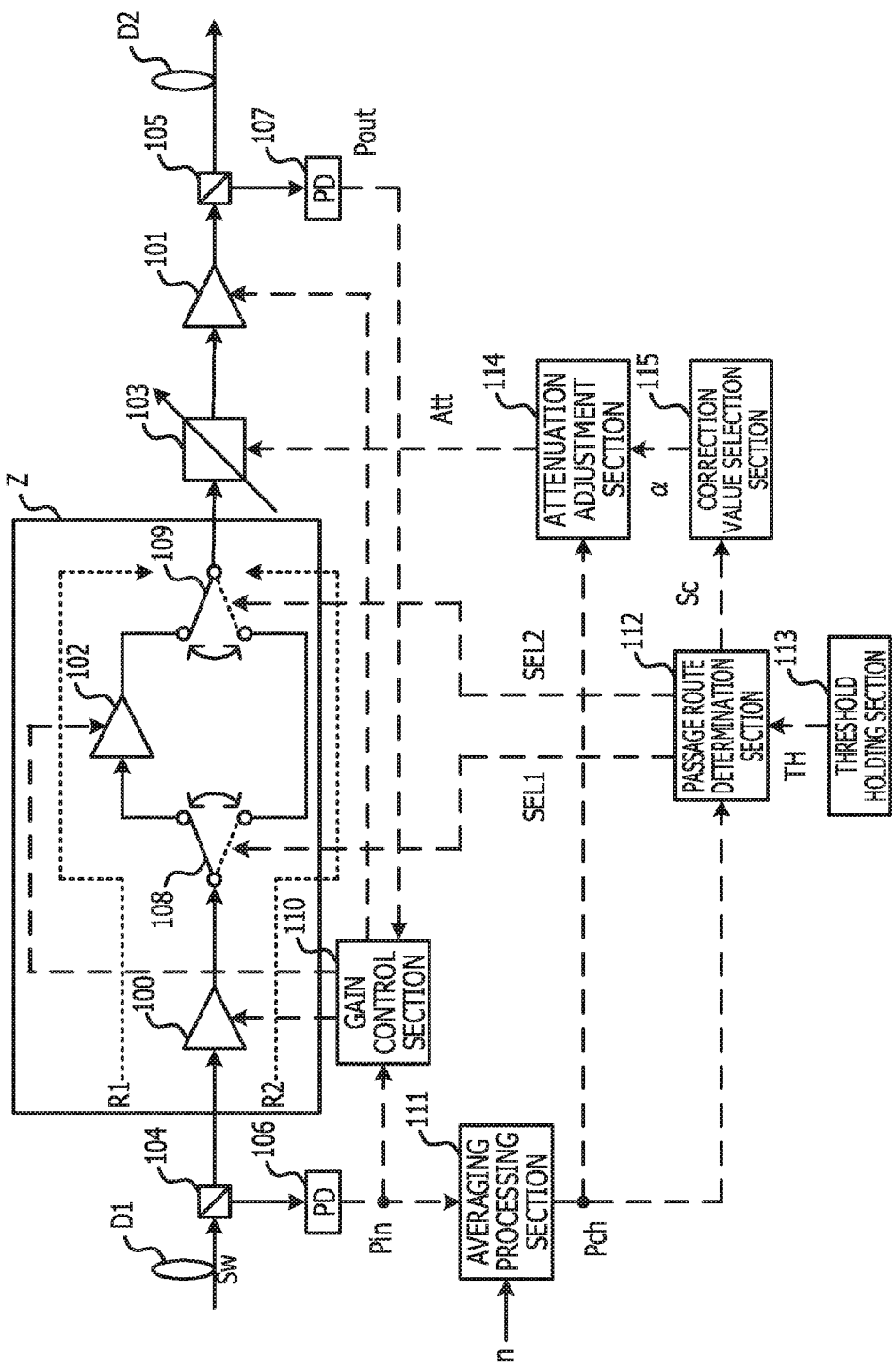
FIG. 4 is a configuration diagram illustrating an optical amplifier according to a first embodiment.

FIG. 4 is a configuration diagram illustrating an optical amplifier according to a first embodiment. In FIG. 4, the same components as those in FIG. 3 are denoted by the same reference characters, and a description thereof will be omitted.

The optical amplifier includes optical demultiplexers 104 and 105, PDs 106 and 107, EDFAs 100 to 102, a variable optical attenuator 103, optical switches 108 and 109, a gain control section 110, an averaging processing section 111, an attenuation adjustment section 114, and a correction value selection section 115. The optical amplifier also includes a passage route determination section 112 and a threshold holding section 113. The gain control section 110, the averaging processing section 111, the attenuation adjustment section 114, the correction value selection section 115, and the passage route determination section 112 are each composed of, for example, a logic circuit, and the threshold holding section 113 is composed of, for example, a memory.

The passage route determination section 112 is one example of a determination section, and determines a passage route for a multiple optical signal Sw among routes R1 and R2 in accordance with input power Pin which is detected by the PD 106. More specifically, the passage route determination section 112 acquires average input power Pch from the averaging processing section 111 and acquires a predetermined threshold TH which is held in the threshold holding section 113. The passage route determination section 112 compares the average input power Pch with the threshold TH and determines the passage route for the multiple optical signal Sw among the routes R1 and R2 in accordance with a result of the comparison.

For example, the passage route determination section 112 determines the route R1 as the passage route if Pch≤TH holds and determines the route R2 as the passage route if Pch>TH holds. Note that the threshold TH is, for example, −30 dBm.

The passage route determination section 112 outputs switching signals SEL1 and SEL2 corresponding to the determined passage route to the optical switches 108 and 109, respectively. With the switching signals SEL1 and SEL2, the optical switches 108 and 109 are switched to form the determined passage route. Thus, the multiple optical signal Sw is amplified by the EDFAs 100 and 102 having appropriate amplifying characteristics corresponding to the input power Pin.

The passage route determination section 112 outputs a piece Sc of route information indicating the determined passage route to the correction value selection section 115. The correction value selection section 115 notifies the attenuation adjustment section 114 of a correction value α corresponding to the piece Sc of route information. For example, the correction value selection section 115 sets the correction value α to 45 dBm if the route R1 is determined as the passage route and sets the correction value α to 30 dBm if the route R2 is determined as the passage route.

The attenuation adjustment section 114 is one example of an adjustment section, and adjusts an attenuation Att of the variable optical attenuator 103 in accordance with the input power Pin detected by the PD 106. More specifically, the attenuation adjustment section 114 calculates the attenuation Att of the variable optical attenuator 103 from the average input power Pch acquired from the averaging processing section 111 and the correction value α, notification of which is given from the correction value selection section 115, by expression (1) above.

A value of the correction value α, notification of which is given from the correction value selection section 115, is selected in accordance with the passage route. The attenuation adjustment section 114 switches the correction value α in accordance with the passage route. Thus, the attenuation adjustment section 114 is capable of easily switching a relationship of the attenuation Att with the input power Pin, that is, the average input power Pch in accordance with the passage route, through selecting the value of the correction value α.

Figure 5:
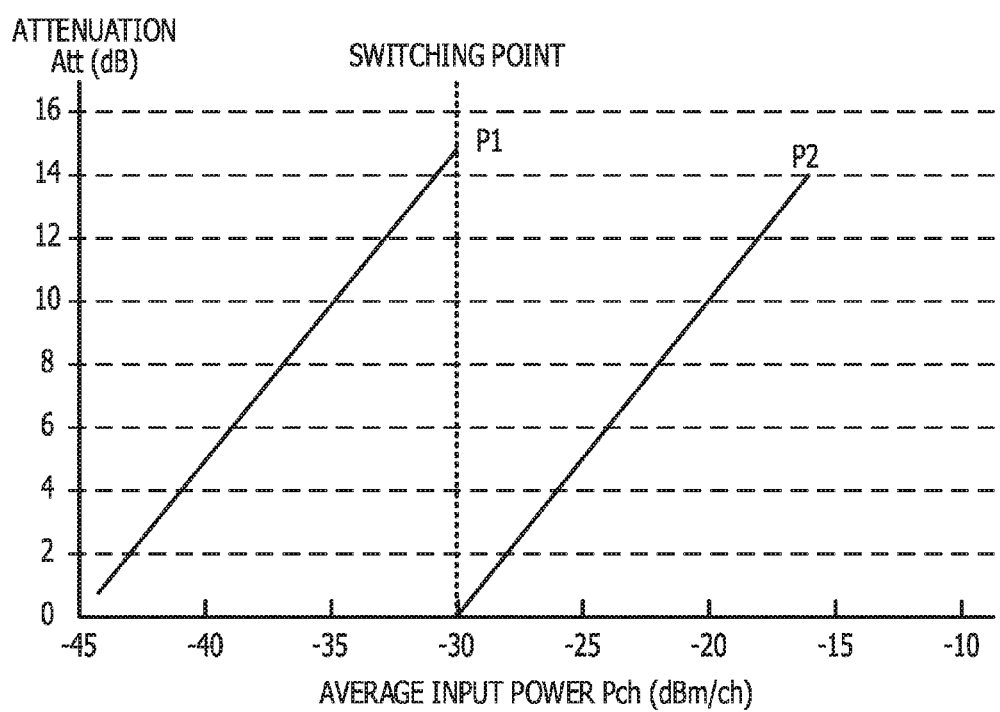
FIG. 5 is a graph illustrating one example of a relationship of attenuation with average input power.

FIG. 5 is a graph illustrating one example of the relationship of the attenuation Att with the average input power Pch.

In the present example, the threshold TH for route switching is set at −30 dBm, the correction value α when the route R1 is determined as the passage route is set at 45 dBm, and the correction value α when the route R2 is determined as the passage route is set at 30 dBm.

Reference character P1 denotes a relationship of the attenuation Att with the average input power Pch when the route R1 is determined as the passage route; and reference character P2 denotes a relationship of the attenuation Att with the average input power Pch when the route R2 is determined as the passage route. In the case of P1, the attenuation Att is 0 dB when the average input power Pch is −45 dBm (note that a lower limit is −44 dBm). In the case of P2, the attenuation Att is 0 dB when the average input power Pch is −30 dBm. The relationships denoted by reference characters P1 and P2 have the threshold TH (=−30 dBm) that is a switching point as a border and are used properly on different occasions.

As described above, the attenuation adjustment section 114 switches the relationship of the attenuation Att with the input power Pin in accordance with the passage route determined by the passage route determination section 112, through selecting the value of the correction value α. For this reason, the attenuation Att of the variable optical attenuator 103 is appropriately adjusted in accordance with an amplifying characteristic for the multiple optical signal Sw in the passage route. Since a gain of the optical amplifier does not change in accordance with the amplifying characteristic in the passage route even if the passage route is switched, a gain deviation for each wavelength is reduced. For example, because the EDFA 102 is designed such that a gain deviation decreases when a gain of about 15 dB is achieved, the correction value α is switched by 15 dB at the switching point for the attenuation Att.

Second Embodiment

The EDFAs 100 to 102 each output amplified spontaneous emission (ASE) light (spontaneous emission) which is a noise. For this reason, the gain control section 110 may perform control in view of power of ASE light, that is, a noise amount in order to improve the accuracy of gain control.

Figure 6:
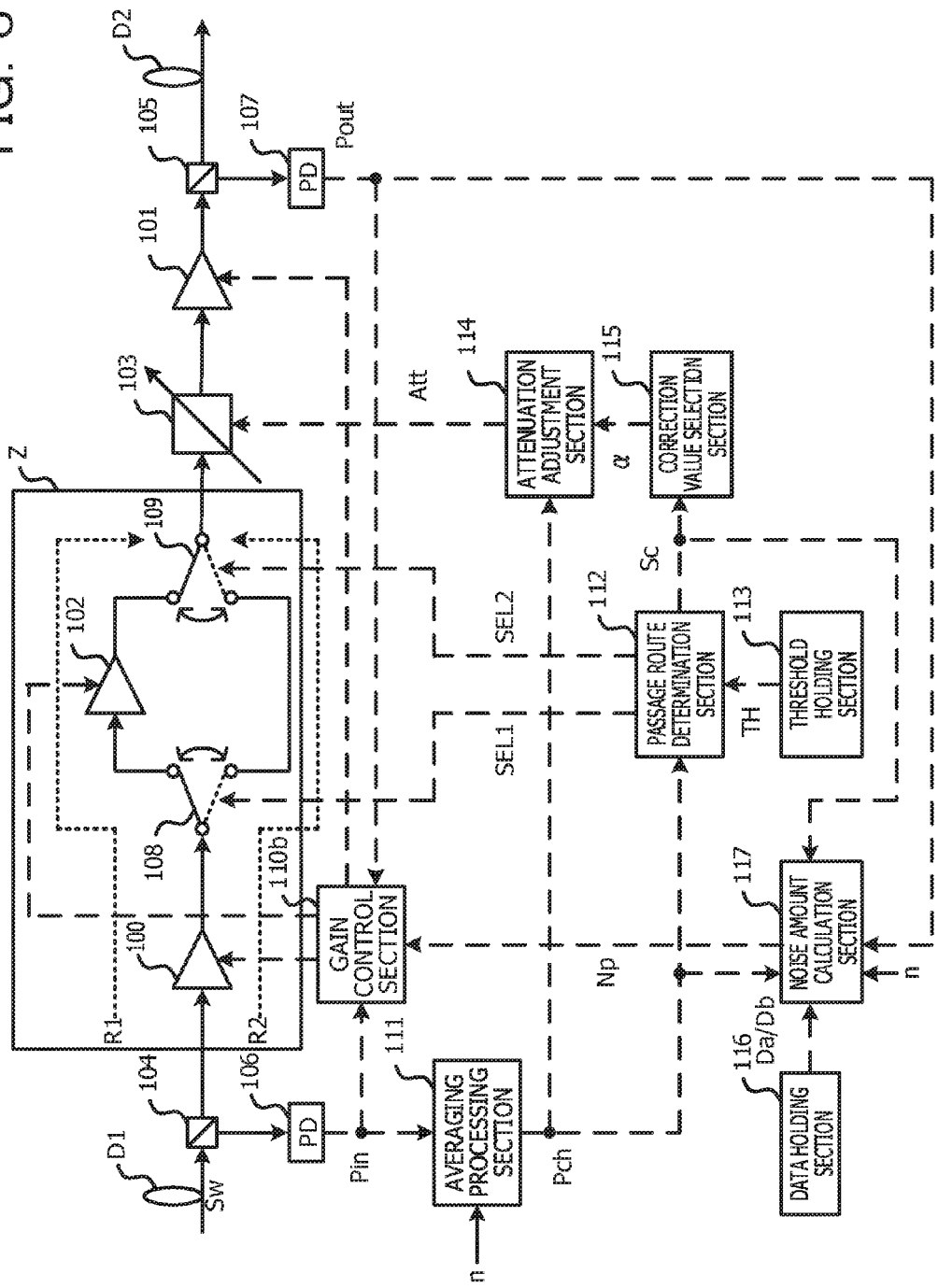
FIG. 6 is a configuration diagram illustrating an optical amplifier according to a second embodiment.

FIG. 6 is a configuration diagram illustrating an optical amplifier according to a second embodiment. In FIG. 6, the same components as those in FIG. 4 are denoted by the same reference characters, and a description thereof will be omitted.

The optical amplifier includes optical demultiplexers 104 and 105, PDs 106 and 107, EDFAs 100 to 102, a variable optical attenuator 103, optical switches 108 and 109, a gain control section 110b, an averaging processing section 111, an attenuation adjustment section 114, and a correction value selection section 115. The optical amplifier also includes a passage route determination section 112, a threshold holding section 113, a data holding section 116, and a noise amount calculation section 117. The gain control section 110b, the averaging processing section 111, the attenuation adjustment section 114, the correction value selection section 115, the passage route determination section 112, and the noise amount calculation section 117 are each composed of, for example, a logic circuit, and the threshold holding section 113 and the data holding section 116 are each composed of, for example, a memory.

The data holding section 116 holds a plurality of types of pieces Da and Db of data indicating a relationship of a noise figure (NF) of the EDFAs 100 to 102 with average input power Pch. The noise amount calculation section 117 is one example of a calculation section, and selects one type of piece of data from among the plurality of types of pieces Da and Db of data in accordance with a passage route which is determined by the passage route determination section 112 and calculates a noise amount from the average input power Pch based on the selected one type of piece of data.

Figure 7:
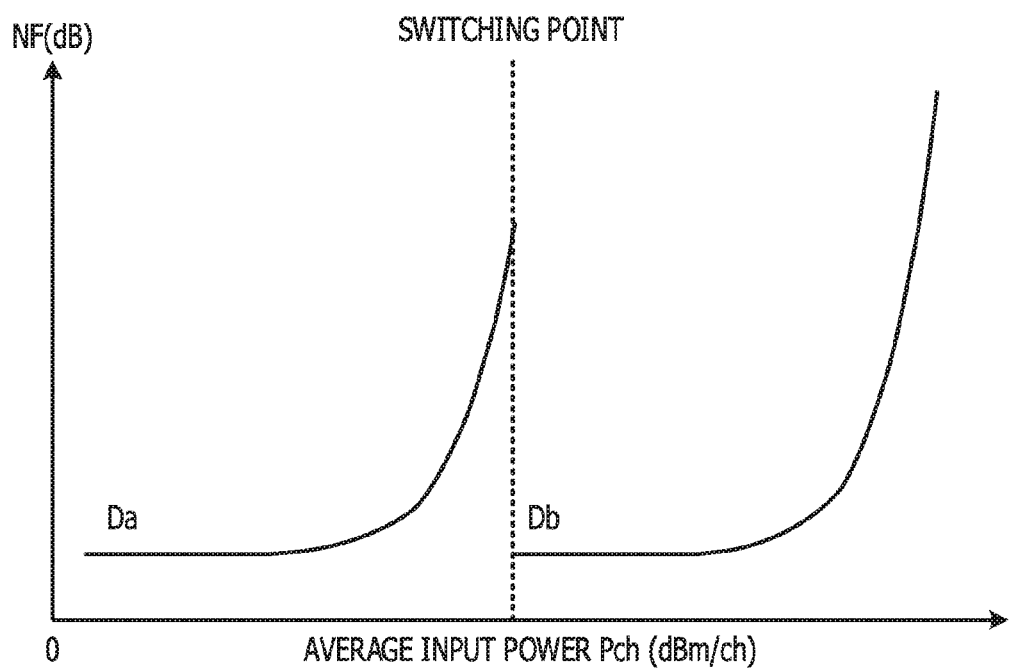
FIG. 7 is a graph illustrating one example of a relationship of a noise figure (NF) with average input power.

FIG. 7 is a graph illustrating one example of the relationship of the noise figure (NF) (dB) with the average input power Pch. By way of example, the data holding section 116 holds the two types of pieces Da and Db of data. The data holding section 116, however, may hold three or more types of pieces of data. The noise figure indicated by the pieces Da and Db of data increases with respect to the average input power Pch over different numerical ranges of the average input power Pch.

The two types of pieces Da and Db of data have a switching point as a border similar to that in FIG. 5 and are used properly on different occasions. More specifically, the noise amount calculation section 117 calculates the noise figure from the average input power Pch by referring to the one piece Da of data if a route R1 is determined as the passage route and calculates the noise figure from the average input power Pch by referring to the other piece Db of data if a route R2 is determined as the passage route.

As described above, the noise amount calculation section 117 switches a piece of reference data between the pieces Da and Db of data in accordance with the passage route. For this reason, the noise figure is calculated with high accuracy based on the appropriate piece Da or Db of data corresponding to an amplifying characteristic in the passage route.

The noise amount calculation section 117 calculates an optical signal-to-noise ratio (OSNR) (dB) by subtracting the noise figure from a value obtained by adding a predetermined value (58, for example) to the average input power Pch.

$$Np = 10 \times \log(\lambda/0.1) + Pout/n - SN \quad (2)$$

The noise amount calculation section 117 calculates a noise amount Np (dBm) from expression (2) above. In expression (2), λ represents a wavelength (nm) of a multiple optical signal Sw, and SN represents an OSNR (dB). Output power Pout is acquired from the PD 107, and the number n of wavelengths is acquired from a control unit (not illustrated). The noise amount calculation section 117 notifies the gain control section 110b of the calculated noise amount Np.

The gain control section 110b is one example of a control section, and controls the EDFAs 100 to 102 based on input power Pin which is detected by the PD 106 and the output power Pout detected by the PD 107 such that gains of the EDFAs 100 to 102 are steady, like the gain control section 110a according to the first comparative example. The gain control section 110b calculates a target value G for a gain based on the noise amount Np calculated by the noise amount calculation section 117.

$$G = 10 \times \log\{10^{(Pout/10)} - 10^{(Np/10)}\} - Pin \quad (3)$$

The gain control section 110b calculates the target value G for the gain by expression (3) above. For this reason, the gain control section 110b is capable of performing control with high accuracy such that the gain is steady, regardless of the passage route for the multiple optical signal Sw. Note that the gain control section 110b calculates the target value G for the gain from a difference between the output power Pout and the input power Pin if the noise amount Np is not taken into account.

The data holding section 116 may hold a plurality of types of pieces Da' and Db' of data indicating a relationship of the noise amount Np of the EDFAs 100 to 102 with the average input power Pch, instead of the relationship of the noise figure (NF) of the EDFAs 100 to 102 with the average input power Pch.

Figure 8:
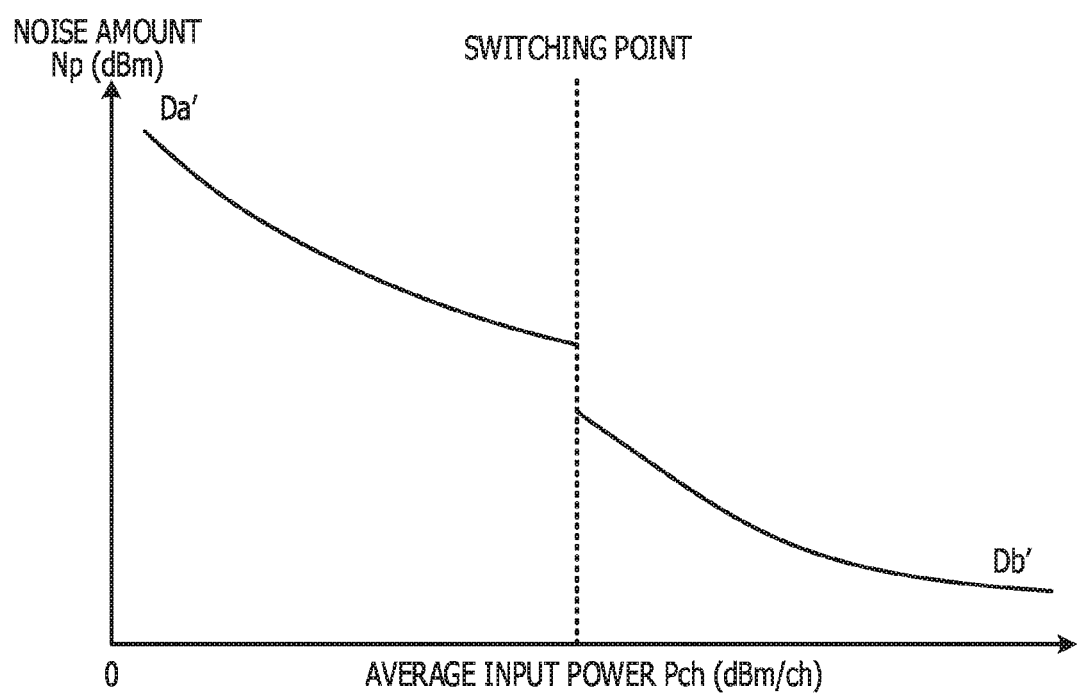
FIG. 8 is a graph illustrating one example of a relationship of a noise amount with the average input power.

FIG. 8 is a graph illustrating one example of the relationship of the noise amount Np with the average input power Pch. The noise amount Np indicated by the pieces Da' and Db' of data decreases with respect to the average input power Pch over different numerical ranges of the average input power Pch.

The two types of pieces Da' and Db' of data have a switching point as a border similar to that in FIG. 5 and are used properly on different occasions. More specifically, the noise amount calculation section 117 calculates the noise amount Np from the average input power Pch by referring to the one piece Da' of data if the route R1 is determined as the passage route and calculates the noise amount Np from the average input power Pch by referring to the other piece Db' of data if the route R2 is determined as the passage route.

As described above, the noise amount calculation section 117 switches the piece of reference data between the pieces Da' and Db' of data in accordance with the passage route. For this reason, the noise amount Np is calculated with high accuracy based on the appropriate piece Da' or Db' of data corresponding to the amplifying characteristic in the passage route.

In the case of FIG. 8, the noise amount calculation section 117 does not have to perform a computation based on expression (3) above and is capable of easily calculating the noise amount Np from the pieces Da' and Db' of data.

Third Embodiment

An optical amplifier may detect an alarm to notify a monitoring apparatus of a network if input power Pin of a multiple optical signal Sw is abnormal. In this case, a normal range for the input power Pin depends on an amplifying characteristic in a passage route for the multiple optical signal Sw. As will be described below, the normality of the input power Pin may be judged based on a criterion corresponding to the passage route.

Figure 9:
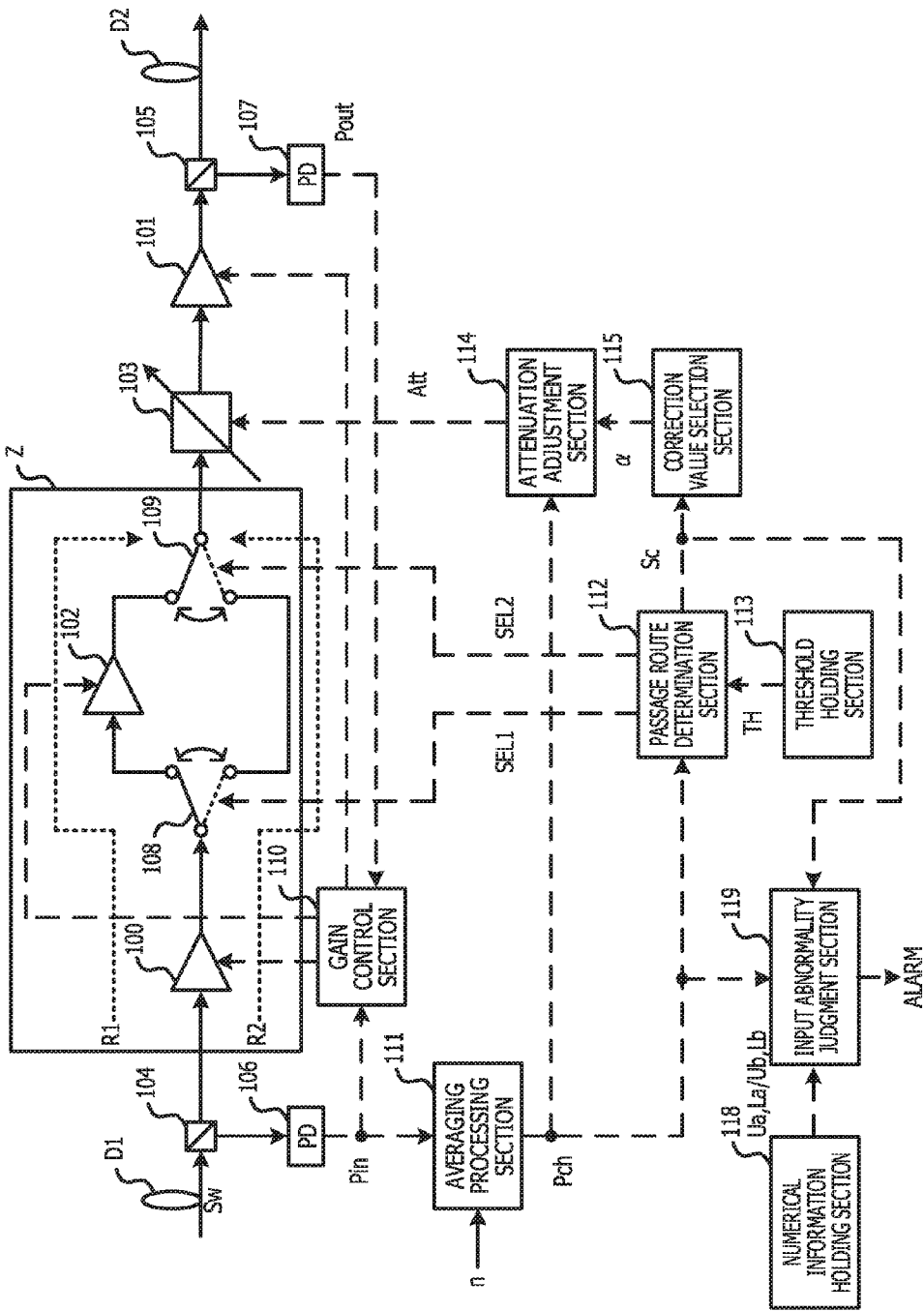
FIG. 9 is a configuration diagram illustrating an optical amplifier according to a third embodiment.

FIG. 9 is a configuration diagram illustrating an optical amplifier according to a third embodiment. In FIG. 9, the same components as those in FIG. 4 are denoted by the same reference characters, and a description thereof will be omitted.

The optical amplifier includes optical demultiplexers 104 and 105, PDs 106 and 107, EDFAs 100 to 102, a variable optical attenuator 103, optical switches 108 and 109, a gain control section 110, an averaging processing section 111, an attenuation adjustment section 114, and a correction value selection section 115. The optical amplifier also includes a passage route determination section 112, a threshold holding section 113, a numerical information holding section 118, and an input abnormality judgment section 119. The gain control section 110, the averaging processing section 111, the attenuation adjustment section 114, the correction value selection section 115, the passage route determination section 112, and the input abnormality judgment section 119 are each composed of, for example, a logic circuit, and the threshold holding section 113 and the numerical information holding section 118 are each composed of, for example, a memory.

The numerical information holding section 118 holds a piece of numerical information indicating a plurality of different numerical ranges. The numerical ranges are normal ranges for average input power Pch corresponding to respective amplifying characteristics in routes R1 and R2.

The input abnormality judgment section 119 is one example of a judgment section. The input abnormality judgment section 119 selects one from among the plurality of numerical ranges held in the numerical information holding section 118 in accordance with a passage route which is determined by the passage route determination section 112 and judges whether input power Pin which is detected by the PD 106 is within the selected numerical range. More specifically, the input abnormality judgment section 119 judges whether the average input power Pch, notification of which is given from the averaging processing section 111, is within the numerical range corresponding to the passage route.

If the average input power Pch is within the numerical range, the input abnormality judgment section 119 judges that the input power Pin of a multiple optical signal Sw is normal. On the other hand, if the average input power Pch is outside the numerical range, the input abnormality judgment section 119 judges that the input power Pin of the multiple optical signal Sw is abnormal and outputs an alarm to a network management apparatus or the like.

More specifically, the numerical information holding section 118 holds, as the piece of numerical information, upper limits Ua and Ub and lower limits La and Lb for numerical ranges. If the passage route determined by the passage route determination section 112 is the route R1, the input abnormality judgment section 119 performs input abnormality judgment based on the upper limit Ua and the lower limit La. For this reason, the input power Pin (Pch) is judged as normal if La≤Pch≤Ua holds and is judged abnormal if Pch<La or Ua<Pch holds.

On the other hand, if the passage route determined by the passage route determination section 112 is the route R2, the input abnormality judgment section 119 performs input abnormality judgment based on the upper limit Ub and the lower limit Lb. For this reason, the input power Pin (Pch) is judged as normal if Lb≤Pch≤Ub holds and is judged abnormal if Pch<Lb or Ub<Pch holds. Note that the relationship La≤Lb≤Ua≤Ub holds for the upper limits Ua and Ub and the lower limits La and Lb.

Thus, the input abnormality judgment section 119 is capable of accurately judging the normality of the input power Pin of the multiple optical signal Sw based on a numerical range suitable for an amplifying characteristic corresponding to the passage route for the multiple optical signal Sw.

Fourth Embodiment

In each of the embodiments described so far, when the passage route for the multiple optical signal Sw is switched by the optical switches 108 and 109 during operation of an apparatus with the optical amplifier mounted therein, an instantaneous interruption of the multiple optical signal Sw occurs. An instantaneous interruption of the multiple optical signal Sw affects the quality of a communication service and is thus unpreferable.

An optical amplifier according to the present embodiment receives test light different from a multiple optical signal Sw from an optical amplifier of a different apparatus before operation of an apparatus and determines a passage route for the multiple optical signal Sw based on input power of the test light, as will be described below.

Figure 10:
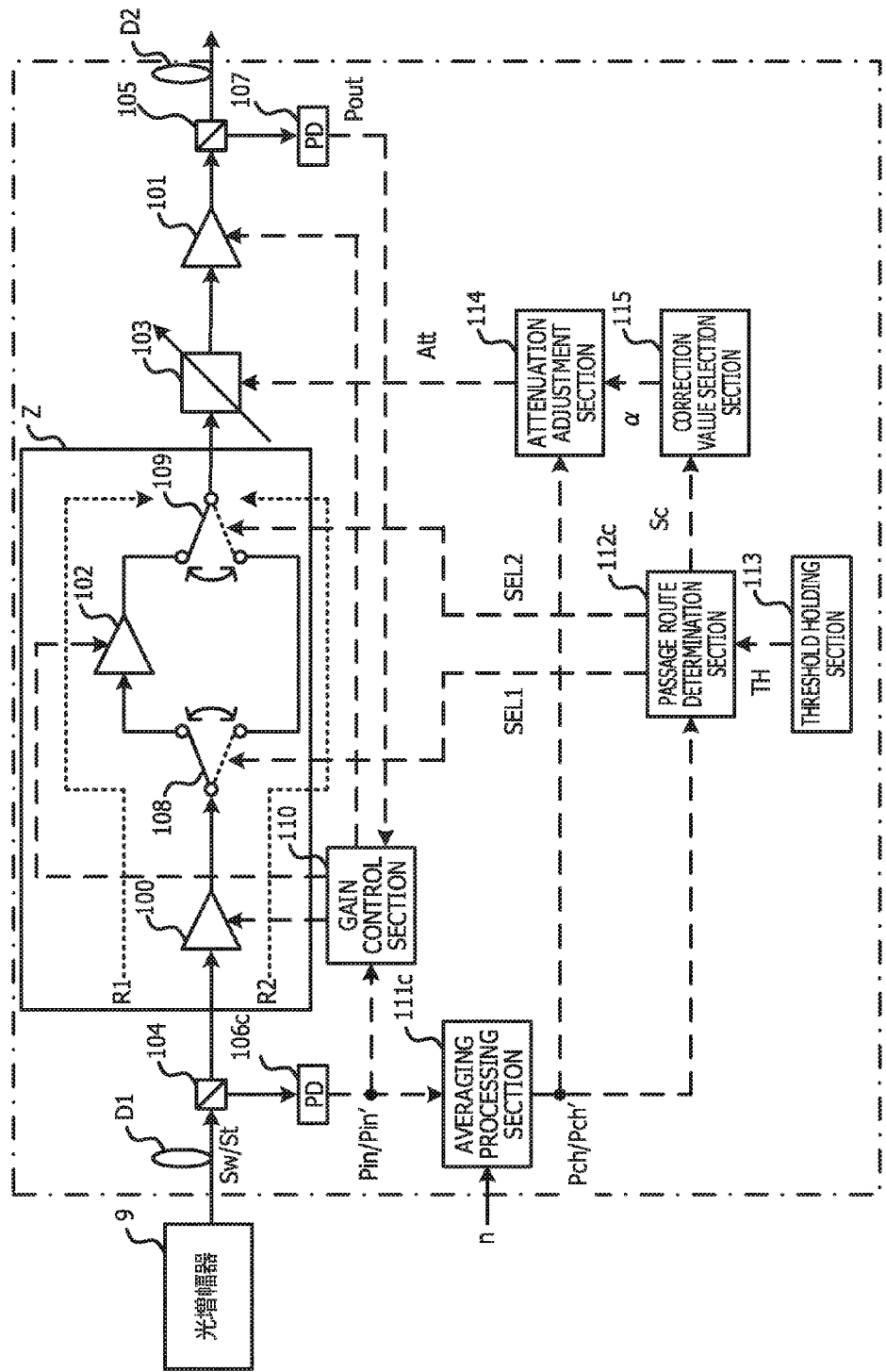
FIG. 10 is a configuration diagram illustrating an optical amplifier according to a fourth embodiment.

FIG. 10 is a configuration diagram illustrating an optical amplifier according to a fourth embodiment. In FIG. 10, the same components as those in FIG. 4 are denoted by the same reference characters, and a description thereof will be omitted. In FIG. 10, an alternate long and short dashed frame indicates the optical amplifier according to the embodiment, and an optical amplifier 9 is mounted in an apparatus different from the optical amplifier according to the embodiment.

The optical amplifier includes optical demultiplexers 104 and 105, PDs 106c and 107, EDFAs 100 to 102, a variable optical attenuator 103, optical switches 108 and 109, a gain control section 110, an averaging processing section 111c, an attenuation adjustment section 114, and a correction value selection section 115. The optical amplifier also includes a passage route determination section 112c and a threshold holding section 113. The gain control section 110, the averaging processing section 111c, the attenuation adjustment section 114, the correction value selection section 115, and the passage route determination section 112c are each composed of, for example, a logic circuit, and the threshold holding section 113 is composed of, for example, a memory. Note that the PD 106c, the averaging processing section 111c, and the passage route determination section 112c have the same functions as the PD 106, the averaging processing section 111, and the passage route determination section 112 and support test light St, as will be described below.

The optical amplifier 9 outputs the test light St, such as ASE light, via a transmission path D1. The test light St is demultiplexed by the optical demultiplexer 104 and input to the PD 106c. The PD 106c detects input power Pin' of the test light St input from the different optical amplifier 9 to the EDFA 100 when a multiple optical signal Sw is not input to the EDFA 100.

The averaging processing section 111c calculates average input power Pch' (=Pin'/n) per wavelength (or per channel) for the input power Pin' detected by the PD 106c. Notification of the calculated average input power Pch' is given to the passage route determination section 112c.

The passage route determination section 112c determines a passage route for the multiple optical signal Sw among routes R1 and R2 in accordance with the input power Pin' of the test light St detected by the PD 106c. More specifically, the passage route determination section 112c determines the passage route based on the average input power Pch' acquired from the averaging processing section 111c and a threshold TH which is acquired from the threshold holding section 113. That is, for example, the passage route determination section 112c determines the route R1 as the passage route if Pch'≤TH holds and determines the route R2 as the passage route if Pch'>TH holds.

As described above, the optical amplifier according to the present embodiment determines the passage route for the multiple optical signal Sw based on the test light St from the different optical amplifier 9 before operation of the apparatus. For this reason, the optical amplifier according to the present embodiment does not switch the passage route for the multiple optical signal Sw during operation of the apparatus and causes no instantaneous interruption.

To reduce a gain deviation for each wavelength even in a case where input power Pin of the multiple optical signal Sw varies to a value close to a switching point for the passage route (see FIG. 5) during operation of the apparatus, a fixed margin may be left for control of an attenuation Att.

Figure 11:
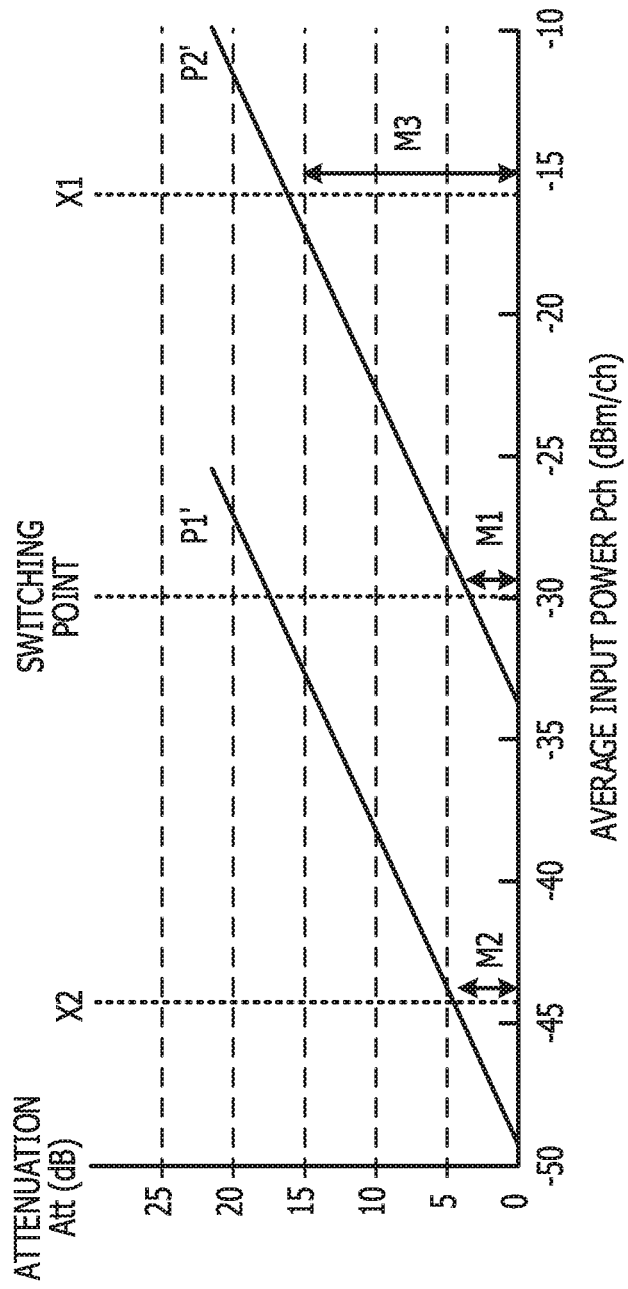
FIG. 11 is a graph illustrating another example of the relationship of attenuation with average input power.

FIG. 11 is a graph illustrating another example of a relationship of the attenuation Att with average input power Pch. In FIG. 11, reference character P1' denotes a relationship of the attenuation Att with the average input power Pch when the route R1 is determined as the passage route; and reference character P2' denotes a relationship of the attenuation Att with the average input power Pch when the route R2 is determined as the passage route. Reference character X1 denotes an upper limit (−16 dBm/ch) for the average input power Pch illustrated in FIG. 5; and reference character X2 denotes a lower limit (−44 dBm/ch) for the average input power Pch illustrated in FIG. 5.

In this example, even if the input power Pin decreases or increases to come close to a switching point (−30 dBm/ch), since the attenuation Att is sufficiently higher (see reference character M1) than 0 dB, gain control is performed without trouble. If the input power Pin decreases to come close to the lower limit X2 or if the input power Pin increases to come close to the upper limit X1, since the attenuation Att falls well within an adjustment range for the variable optical attenuator 103 (see reference characters M2 and M3), gain control is performed without trouble.

Note that the above-described first to fourth embodiments may be individually practiced or a combination of at least parts of the embodiments may be practiced.

Application Target Apparatuses

An apparatus to which the optical amplifier according to each embodiment is applied will be described. In the description below, an optical transmission apparatus and an optical repeating apparatus will be given as examples of the apparatus, to which the optical amplifier is applied.

Figure 12:
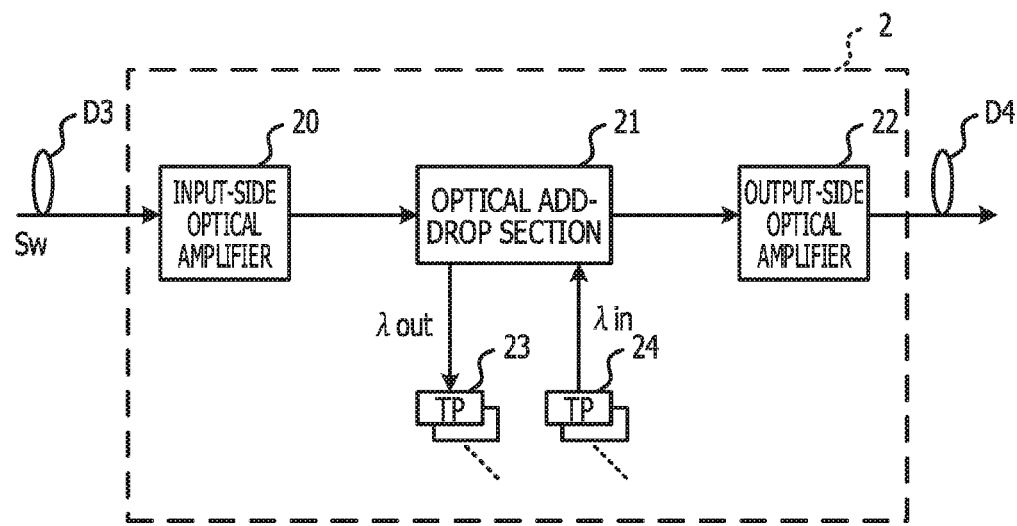
FIG. 12 is a configuration diagram illustrating one example of an optical transmission apparatus.

FIG. 12 is a configuration diagram illustrating one example of an optical transmission apparatus. In the present example, a ROADM apparatus is used as an optical transmission apparatus 2. The present application, however, is not limited to this.

The optical transmission apparatus 2 includes an input-side optical amplifier 20, an optical add-drop section 21, an output-side optical amplifier 22, and a plurality of optical transceivers (TPs) 23 and 24. The input-side optical amplifier 20 is an optical amplifier according to one of the above-described embodiments, and amplifies a multiple optical signal Sw input from a transmission path D3.

The optical add-drop section 21 performs optical signal addition and dropping on the multiple optical signal Sw that is amplified by the input-side optical amplifier 20. More specifically, the optical add-drop section 21 extracts an optical signal with a given wavelength λout from the multiple optical signal Sw and outputs the optical signal to the optical transceiver 23 in accordance with settings from a control unit (not illustrated), and multiplexes an optical signal with a given wavelength λin from the optical transceiver 24 into the multiple optical signal Sw and outputs the multiple optical signal Sw to the output-side optical amplifier 22.

The optical add-drop section 21 includes, for example, a wavelength selective switch (WSS) which selects a given wavelength, an optical coupler which multiplexes an optical signal, an optical splitter which demultiplexes an optical signal, and the like. Note that the optical add-drop section 21 may perform one alone of dropping and addition of an optical signal.

The output-side optical amplifier 22 amplifies the multiple optical signal Sw input from the optical add-drop section 21 and outputs the amplified multiple optical signal Sw to a transmission path D4. The optical transmission apparatus is capable of wavelength-multiplexing a plurality of optical signals different in wavelength and transmitting a resultant signal as the multiple optical signal Sw. This allows transmission of large volumes of data.

Figure 13:
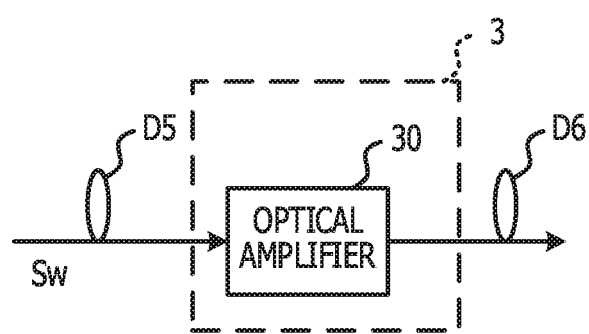
FIG. 13 is a configuration diagram illustrating one example of an optical repeating apparatus.

FIG. 13 is a configuration diagram illustrating one example of an optical repeating apparatus. An optical repeating apparatus 3 includes an optical amplifier 30 according to one of the above-described embodiments, and amplifies a multiple optical signal Sw input from a transmission path D5 with the optical amplifier 30 and relays the amplified multiple optical signal Sw to a different apparatus via a transmission path D6. That is, the optical repeating apparatus 3 amplifies the multiple optical signal Sw input from the transmission path D5 with the optical amplifier 30. The optical repeating apparatus is capable of relaying the multiple optical signal Sw, for example, even if the optical repeating apparatus is connected to an adjacent optical transmission apparatus by a long-distance transmission path.

As has been described so far, the optical amplifier according to each embodiment includes the amplification section Z, the passage route determination section 112 or 112c, the PDs 106 or 106c and 107, the variable optical attenuator 103, the gain control section 110 or 110b, and the attenuation adjustment section 114. The amplification section Z is provided with the plurality of routes R1 and R2 different in amplifying characteristic for amplifying the multiple optical signal Sw to pass through the routes R1 and R2.

The passage route determination section 112 or 112c determines a passage route, through which the multiple optical signal Sw passes, among the plurality of routes R1 and R2. The variable optical attenuator 103 attenuates the multiple optical signal Sw that is amplified through passing through the passage route determined by the passage route determination section 112 or 112c.

The PD 107 detects the output power Pout of the multiple optical signal Sw attenuated by the variable optical attenuator 103. The gain control section 110 or 110b controls the amplification section Z (the EDFAs 100 to 102) based on the input power Pin detected by the PD 106 or 106c and the output power Pout detected by the PD 107 such that a gain of the optical amplifier is steady.

The attenuation adjustment section 114 adjusts the attenuation Att of the variable optical attenuator 103 in accordance with the input power Pin detected by the PD 106 or 106c. The attenuation adjustment section 114 switches a relationship of the attenuation Att with the input power Pin in accordance with the passage route.

With the above-described configuration, the attenuation adjustment section 114 switches the relationship of the attenuation Att with the input power Pin in accordance with the passage route determined by the passage route determination section 112 or 112c. For this reason, the attenuation Att of the variable optical attenuator 103 is appropriately adjusted in accordance with an amplifying characteristic for the multiple optical signal Sw in the passage route. Since the gain of the optical amplifier does not change in accordance with the amplifying characteristic in the passage route even if the passage route is switched, a gain deviation for each wavelength is reduced.

The optical transmission apparatus 2 according to each embodiment includes the input-side optical amplifier 20 that amplifies the multiple optical signal Sw and the optical add-drop section 21 that performs at least one of optical signal addition and optical signal dropping on the multiple optical signal Sw amplified by the input-side optical amplifier 20.

The input-side optical amplifier 20 includes the amplification section Z, the passage route determination section 112 or 112c, the PDs 106 or 106c and 107, the variable optical attenuator 103, the gain control section 110 or 110b, and the attenuation adjustment section 114. The amplification section Z is provided with the plurality of routes R1 and R2 different in amplifying characteristic for amplifying the multiple optical signal Sw to pass through the routes R1 and R2.

The passage route determination section 112 or 112c determines a passage route, through which the multiple optical signal Sw passes, among the plurality of routes R1 and R2. The variable optical attenuator 103 attenuates the multiple optical signal Sw that is amplified through passing through the passage route determined by the passage route determination section 112 or 112c.

The PD 107 detects the output power Pout of the multiple optical signal Sw attenuated by the variable optical attenuator 103. The gain control section 110 or 110b controls the amplification section Z (the EDFAs 100 to 102) based on the input power Pin detected by the PD 106 or 106c and the output power Pout detected by the PD 107 such that a gain of the optical amplifier is steady.

The attenuation adjustment section 114 adjusts the attenuation Att of the variable optical attenuator 103 in accordance with the input power Pin detected by the PD 106 or 106c. The attenuation adjustment section 114 switches a relationship of the attenuation Att with the input power Pin in accordance with the passage route.

The optical transmission apparatus 2 according to each embodiment has the same configuration as the above-described optical amplifiers and achieves the same working effects as described above.

The optical repeating apparatus 3 according to each embodiment amplifies the multiple optical signal Sw with the optical amplifier 30 and relays the amplified multiple optical signal Sw to a different apparatus.

The optical amplifier 30 includes the amplification section Z, the passage route determination section 112 or 112c, the PDs 106 or 106c and 107, the variable optical attenuator 103, the gain control section 110 or 110b, and the attenuation adjustment section 114. The amplification section Z is provided with the plurality of routes R1 and R2 different in amplifying characteristic for amplifying the multiple optical signal Sw to pass through the routes R1 and R2.

The passage route determination section 112 or 112c determines a passage route, through which the multiple optical signal Sw passes, among the plurality of routes R1 and R2. The variable optical attenuator 103 attenuates the multiple optical signal Sw that is amplified through passing through the passage route determined by the passage route determination section 112 or 112c.

The PD 107 detects the output power Pout of the multiple optical signal Sw attenuated by the variable optical attenuator 103. The gain control section 110 or 110b controls the amplification section Z (the EDFAs 100 to 102) based on the input power Pin detected by the PD 106 or 106c and the output power Pout detected by the PD 107 such that a gain of the optical amplifier is steady.

The attenuation adjustment section 114 adjusts the attenuation Att of the variable optical attenuator 103 in accordance with the input power Pin detected by the PD 106. The attenuation adjustment section 114 switches a relationship of the attenuation Att with the input power Pin in accordance with the passage route.

The optical repeating apparatus 3 according to the embodiment has the same configuration as the above-described optical amplifiers and achieves the same working effects as described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier comprising:
   an amplification section includes a plurality of routes, each of the plurality of routes has an amplifying characteristic for amplifying a multi-wavelength optical signal to pass through the routes, the amplifying characteristic of one of the plurality of routes is different from the amplifying characteristic of other of the plurality of routes;
   a determination section that determines a passage route, through which the multi-wavelength optical signal passes, among the plurality of routes;
   an input-side detector that detects input power of the multi-wavelength optical signal input to the amplification section;
   a variable optical attenuator that attenuates the multi-wavelength optical signal that is amplified through passing through the passage route determined by the determination section;
   an output-side detector that detects output power of the multi-wavelength optical signal attenuated by the variable optical attenuator;
   a controller that controls the amplification section based on the input power detected by the input-side detector and the output power detected by the output-side detector such that a gain of the amplification section is steady;
   an adjuster that adjusts an attenuation of the variable optical attenuator in accordance with the input power detected by the input-side detector, wherein the adjuster switches a relationship of the attenuation with the input power in accordance with the passage route;
   a data holding section that holds a plurality of types of pieces of data indicating a relationship of a noise figure of the amplification section or power of ASE light with the input power; and
   a calculation section that selects one type of piece of data from among the plurality of types of pieces of data in accordance with the passage route determined by the determination section and calculate the power of the ASE light from the input power detected by the input-side detector based on the selected one type of piece of data,
   wherein the controller calculates a target value for the gain based on the power of the ASE light calculated by the calculation section.

2. The optical amplifier according to claim 1, wherein the adjuster adjusts the attenuation of the variable optical attenuator based on the input power and a correction value and switches the correction value in accordance with the passage route.

3. The optical amplifier according to claim 1, wherein the determination section determines the passage route among the plurality of routes in accordance with the input power detected by the input-side detector.

4. The optical amplifier according to claim 3, wherein the input-side detector detects input power of test light input from a different apparatus to the amplification section when the multi-wavelength optical signal is not input to the amplification section, and
the determination section determines the passage route among the plurality of routes in accordance with the input power of the test light detected by the input-side detector.

5. An optical amplifier comprising:
   an amplification section includes a plurality of routes, each of the plurality of routes has an amplifying characteristic for amplifying a multi-wavelength optical signal to pass through the routes, the amplifying characteristic of one of the plurality of routes is different from the amplifying characteristic of other of the plurality of routes;
   a determination section that determines a passage route, through which the multi-wavelength optical signal passes, among the plurality of routes;
   an input-side detector that detects input power of the multi-wavelength optical signal input to the amplification section;
   a variable optical attenuator that attenuates the multi-wavelength optical signal that is amplified through passing through the passage route determined by the determination section;
   an output-side detector that detects output power of the multi-wavelength optical signal attenuated by the variable optical attenuator;
   a controller that controls the amplification section based on the input power detected by the input-side detector and the output power detected by the output-side detector such that a gain of the amplification section is steady;
   an adjuster that adjusts an attenuation of the variable optical attenuator in accordance with the input power detected by the input-side detector, wherein the adjuster switches a relationship of the attenuation with the input power in accordance with the passage route;
   a numerical information holding section that holds a piece of numerical information indicating a plurality of different numerical ranges; and
   a judgment section that selects one from among the plurality of numerical ranges in accordance with the passage route determined by the determination section and judge whether the input power detected by the input-side detector is within the selected numerical range.

6. An optical transmission apparatus comprising:
   an optical amplifier that amplifies a multi-wavelength optical signal; and
   an optical add-drop section that performs optical signal addition or optical signal dropping on the multi-wavelength optical signal amplified by the optical amplifier, wherein
   the optical amplifier includes
      an amplification section provided with a plurality of routes different in amplifying characteristic for amplifying a multi-wavelength optical signal to pass through the routes,
      a determination section that determines a passage route, through which the multi-wavelength optical signal passes, among the plurality of routes,
      an input-side detector that detects input power of the multi-wavelength optical signal input to the amplification section, a variable optical attenuator that attenuates the multi-wavelength optical signal that is amplified through passing through the passage route determined by the determination section, an output-side detector that detects output power of the multi-wavelength optical signal attenuated by the variable optical attenuator, a controller that controls the amplification section based on the input power detected by the input-side detector and the output power detected by the output-side detector such that a gain of the amplification section is steady, an adjuster that adjusts an attenuation of the variable optical attenuator in accordance with the input power detected by the input-side detector, wherein the adjuster switches a relationship of the attenuation with the input power in accordance with the passage route, a data holding section that holds a plurality of types of pieces of data indicating a relationship of a noise figure of the amplification section or power of ASE light with the input power, and a calculation section that selects one type of piece of data from among the plurality of types of pieces of data in accordance with the passage route determined by the determination section and calculate the power of the ASE light from the input power detected by the input-side detector based on the selected one type of piece of data, wherein the controller calculates a target value for the gain based on the power of the ASE light calculated by the calculation section.

7. The optical transmission apparatus according to claim 6, wherein the adjuster adjusts the attenuation of the variable optical attenuator based on the input power and a correction value and switches the correction value in accordance with the passage route.

8. The optical transmission apparatus according to claim 6, wherein the determination section determines the passage route among the plurality of routes in accordance with the input power detected by the input-side detector.

9. The optical transmission apparatus according to claim 8, wherein the input-side detector detects input power of test light input from a different apparatus to the amplification section when the multi-wavelength optical signal is not input to the amplification section, and the determination section determines the passage route among the plurality of routes in accordance with the input power of the test light detected by the input-side detector.

10. An optical transmission apparatus comprising:

an optical amplifier that amplifies a multi-wavelength optical signal; and an optical add-drop section that performs optical signal addition or optical signal dropping on the multi-wavelength optical signal amplified by the optical amplifier, wherein the optical amplifier includes an amplification section provided with a plurality of routes different in amplifying characteristic for amplifying a multi-wavelength optical signal to pass through the routes, a determination section that determines a passage route, through which the multi-wavelength optical signal passes, among the plurality of routes, an input-side detector that detects input power of the multi-wavelength optical signal input to the amplification section, a variable optical attenuator that attenuates the multi-wavelength optical signal that is amplified through passing through the passage route determined by the determination section, an output-side detector that detects output power of the multi-wavelength optical signal attenuated by the variable optical attenuator, a controller that controls the amplification section based on the input power detected by the input-side detector and the output power detected by the output-side detector such that a gain of the amplification section is steady, an adjuster that adjusts an attenuation of the variable optical attenuator in accordance with the input power detected by the input-side detector, wherein the adjuster switches a relationship of the attenuation with the input power in accordance with the passage route, a numerical information holding section that holds a piece of numerical information indicating a plurality of different numerical ranges, and a judgment section that selects one from among the plurality of numerical ranges in accordance with the passage route determined by the determination section and judge whether the input power detected by the input-side detector is within the selected numerical range.

11. An optical repeating apparatus that amplifies a multi-wavelength optical signal with an optical amplifier and relays the amplified multi-wavelength optical signal to a different apparatus, wherein the optical amplifier includes an amplification section provided with a plurality of routes different in amplifying characteristic for amplifying the multi-wavelength optical signal to pass through the routes, a determination section that determines a passage route, through which the multi-wavelength optical signal passes, among the plurality of routes, an input-side detector detects input power of the multi-wavelength optical signal input to the amplification section, a variable optical attenuator that attenuates the multi-wavelength optical signal that is amplified through passing through the passage route determined by the determination section, an output-side detector that detects output power of the multi-wavelength optical signal attenuated by the variable optical attenuator, a controller that controls the amplification section based on the input power detected by the input-side detector and the output power detected by the output-side detector such that a gain of the amplification section is steady, an adjuster that adjusts an attenuation of the variable optical attenuator in accordance with the input power detected by the input-side detector, wherein the adjuster switches a relationship of the attenuation with the input power in accordance with the passage route, a data holding section that holds a plurality of types of pieces of data indicating a relationship of a noise figure of the amplification section or power of ASE light with the input power, and a calculation section that selects one type of piece of data from among the plurality of types of pieces of data in accordance with the passage route determined by the determination section and calculate the power of the ASE light from the input power detected by the input-side detector based on the selected one type of piece of data, wherein the controller calculates a target value for the gain based on the power of the ASE light calculated by the calculation section.

12. The optical repeating apparatus according to claim 11, wherein the adjuster adjusts the attenuation of the variable optical attenuator based on the input power and a correction value and switches the correction value in accordance with the passage route.

13. The optical repeating apparatus according to claim 11, wherein the determination section determines the passage route among the plurality of routes in accordance with the input power detected by the input-side detector.

14. The optical repeating apparatus according to claim 13, wherein the input-side detector detects input power of test light input from a different apparatus to the amplification section when the multi-wavelength optical signal is not input to the amplification section, and the determination section determines the passage route among the plurality of routes in accordance with the input power of the test light detected by the input-side detector.

15. An optical repeating apparatus that amplifies a multi-wavelength optical signal with an optical amplifier and relays the amplified multi-wavelength optical signal to a different apparatus, wherein the optical amplifier includes:

an amplification section provided with a plurality of routes different in amplifying characteristic for amplifying the multi-wavelength optical signal to pass through the routes, a determination section that determines a passage route, through which the multi-wavelength optical signal passes, among the plurality of routes, an input-side detector detects input power of the multi-wavelength optical signal input to the amplification section, a variable optical attenuator that attenuates the multi-wavelength optical signal that is amplified through passing through the passage route determined by the determination section, an output-side detector that detects output power of the multi-wavelength optical signal attenuated by the variable optical attenuator, a controller that controls the amplification section based on the input power detected by the input-side detector and the output power detected by the output-side detector such that a gain of the amplification section is steady, an adjuster that adjusts an attenuation of the variable optical attenuator in accordance with the input power detected by the input-side detector, wherein the adjuster switches a relationship of the attenuation with the input power in accordance with the passage route, a numerical information holding section that holds a piece of numerical information indicating a plurality of different numerical ranges, and a judgment section that selects one from among the plurality of numerical ranges in accordance with the passage route determined by the determination section and judge whether the input power detected by the input-side detector is within the selected numerical range.

\* \* \* \* \*